United States Patent
Sajadi et al.

(10) Patent No.: US 9,195,121 B2
(45) Date of Patent: Nov. 24, 2015

(54) MARKERLESS GEOMETRIC REGISTRATION OF MULTIPLE PROJECTORS ON EXTRUDED SURFACES USING AN UNCALIBRATED CAMERA

(75) Inventors: Behzad Sajadi, Irvine, CA (US); Aditi Majumder, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 530 days.

(21) Appl. No.: 13/318,092

(22) PCT Filed: Apr. 28, 2010

(86) PCT No.: PCT/US2010/032835
§ 371 (c)(1),
(2), (4) Date: Nov. 29, 2011

(87) PCT Pub. No.: WO2010/129363
PCT Pub. Date: Nov. 11, 2010

(65) Prior Publication Data
US 2012/0098937 A1    Apr. 26, 2012

Related U.S. Application Data

(60) Provisional application No. 61/173,491, filed on Apr. 28, 2009.

(51) Int. Cl.
H04N 13/02    (2006.01)
G03B 21/14   (2006.01)
H04N 9/31    (2006.01)

(52) U.S. Cl.
CPC .............. *G03B 21/14* (2013.01); *H04N 9/3147* (2013.01); *H04N 9/3185* (2013.01); *H04N 9/3194* (2013.01); *H04N 9/3197* (2013.01)

(58) Field of Classification Search
CPC ....................................................... G03B 21/14
USPC ............................................................. 348/46
See application file for complete search history.

(56) References Cited

U.S. PATENT DOCUMENTS 6,456,339 B1 * 9/2002 Surati et al. .................... 348/745
6,510,244 B2 * 1/2003 Proesmans et al. ........... 382/203
(Continued)

OTHER PUBLICATIONS

Automatic alignment of high-resolution multi-projector displays using an UN-calibrated camera; Chen et al. (2000).*
(Continued)

*Primary Examiner* — William C Vaughn, Jr.
*Assistant Examiner* — Luis Perez Fuentes
(74) *Attorney, Agent, or Firm* — Shimokaji IP

(57) ABSTRACT

A method for registering multiple projectors on a vertically extruded three dimensional display surface with a known aspect ratio includes recovering both the camera parameters and the three dimensional shape of the surface from a single image of the display surface from an uncalibrated camera, capturing images from the projectors to relate the projector coordinates with the display surface points, and segmenting parts of the image for each projector to register the projectors to create a seamlessly wall-paper projection on the display surface using a representation between the projector coordinates with display surface points using a rational Bezier patch. A method for performing a deterministic geometric auto-calibration to find intrinsic and extrinsic parameters of each projector is included.

15 Claims, 11 Drawing Sheets

(56) References Cited

U.S. PATENT DOCUMENTS

| | | | |
|---|---|---|---|
| 6,733,138 B2 * | 5/2004 | Raskar | 353/94 |
| 6,811,264 B2 * | 11/2004 | Raskar et al. | 353/94 |
| 7,010,080 B2 * | 3/2006 | Mitschke et al. | 378/8 |
| 7,019,713 B2 * | 3/2006 | Hereld et al. | 345/1.1 |
| 7,663,640 B2 * | 2/2010 | Nayar et al. | 345/589 |
| 7,740,361 B2 * | 6/2010 | Jaynes et al. | 353/122 |
| 7,893,393 B2 * | 2/2011 | Webb et al. | 250/208.1 |
| 7,942,530 B2 * | 5/2011 | Majumder et al. | 353/30 |
| 7,967,451 B2 * | 6/2011 | Chen et al. | 353/98 |
| 8,023,726 B2 * | 9/2011 | Sundaresan et al. | 382/154 |
| 8,147,073 B2 * | 4/2012 | Yamamoto et al. | 353/69 |
| 8,237,873 B2 * | 8/2012 | Nelson | 348/745 |
| 8,328,365 B2 * | 12/2012 | Sun | 353/69 |
| 8,355,601 B2 * | 1/2013 | Ding et al. | 382/294 |
| 2010/0266220 A1 * | 10/2010 | Zagorchev et al. | 382/285 |

OTHER PUBLICATIONS

Multi-projector displays using camera-based registration; Ramesh et al. (1999).*

* cited by examiner

Fig. 4a    Fig. 4b    Fig. 4c
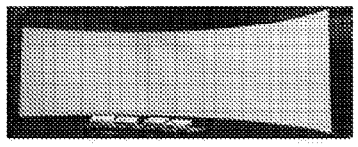 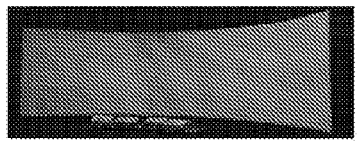 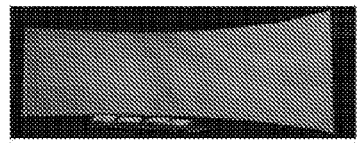
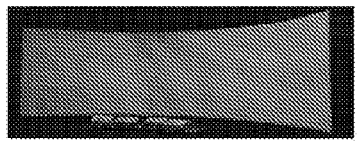 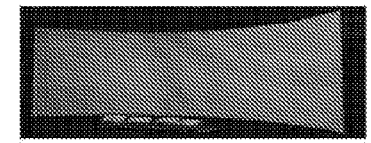
Fig. 4d    Fig. 4e
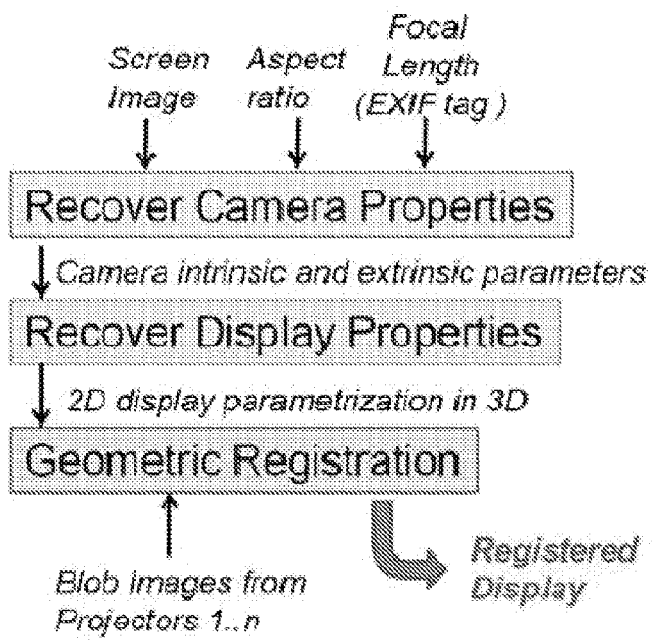
Fig. 5

Fig. 6a
Fig. 6b
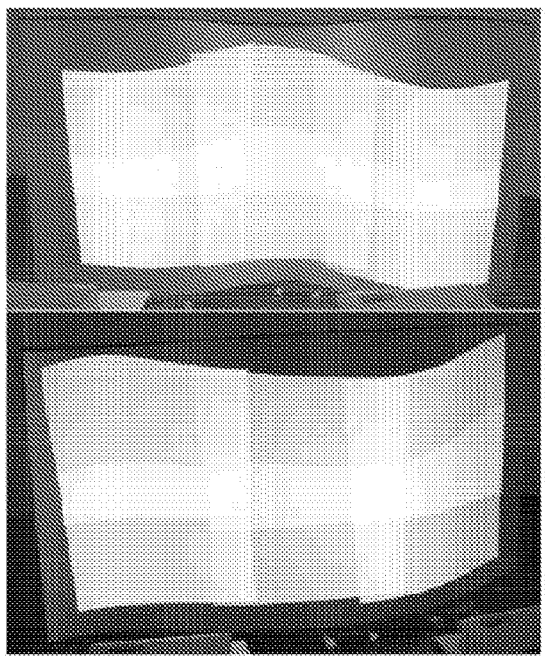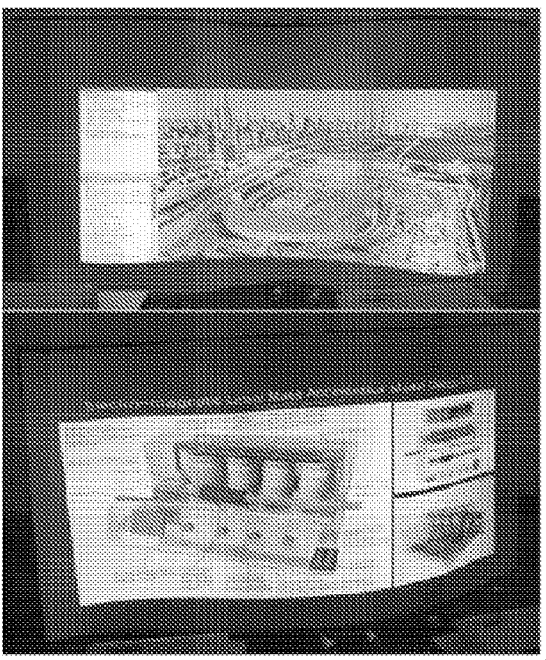
Fig. 6c
Fig. 6d

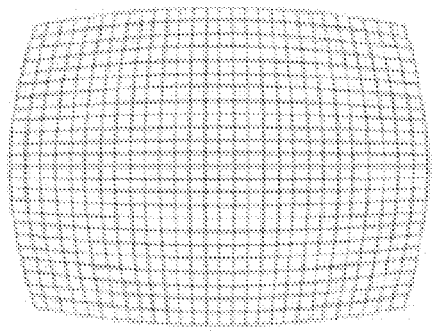
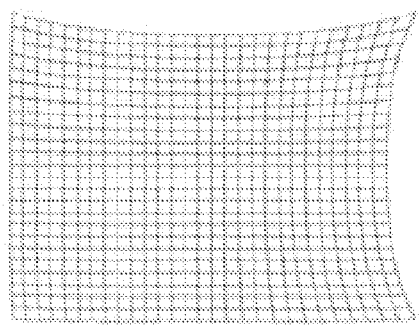
Fig. 8a    Fig. 8b
Fig. 9a    Fig. 9b
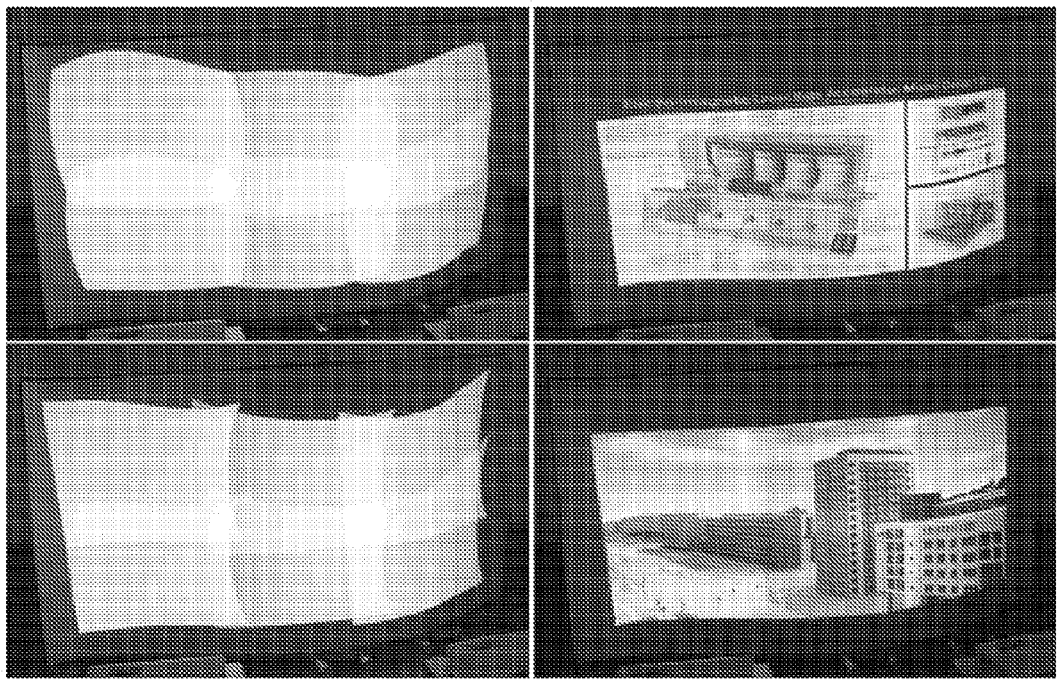
Fig. 9c    Fig. 9d

MARKERLESS GEOMETRIC REGISTRATION OF MULTIPLE PROJECTORS ON EXTRUDED SURFACES USING AN UNCALIBRATED CAMERA

RELATED APPLICATIONS

The present application is related to U.S. Provisional Patent Application Ser. No. 61/173,491 filed on Apr. 28, 2009, which is incorporated herein by reference and to which priority is claimed pursuant to 35 USC 119.

This invention was made with Government support under Grant No. 0743117, awarded by the National Science Foundation. The Government has certain rights in this invention.

BACKGROUND OF THE INVENTION

1. Field of the Invention

The invention relates to the field of methods for registering multiple projectors on a vertically extruded three dimensional display surface with a known aspect ratio.

2. Description of the Prior Art

Tiled multi-projector displays on curved screens (e.g. cylindrical or spherical screens) are becoming more popular for visualization, education, entertainment, training and simulation applications. Their appeal lies in the greater sense of immersion and presence they can create and at times, the superior aesthetics they provide. Displays are tools used by these application users who are not expected to be experts in setting them up or maintaining them. Unfortunately, most registration algorithms designed for curved displays expect them to be one. Registering multiple projectors on such a display has been a challenge, primarily due to the fact that recovering the three dimensional shape of the display fast almost always require attaching fiducials (physical markers) on the display screen for providing robust correspondence between the screen and the camera, which is especially obtrusive. Or, this needs the use of calibrated stereo cameras with the aid of structured light patterns, resulting in a time consuming process. Finally, both these methods are complex requiring a complex camera calibration, all of which are too difficult for a layman user to execute in a successful manner—often more complex than registering the multiple projectors. Putting physical markers is obtrusive. The calibration process is also cumbersome and complex. Further, they cannot handle projectors with severe non-linearity.

What is needed is a simple procedure to register multiple projectors on a curved display that can be used even by a layman user like the doctor in a medical facility, teacher in a school or a worker in a theme park.

The prior art includes: U.S. Pat. No. 7,121,667 (Geometrically correcting method and system for image distortion with the aid of an auxiliary line) and U.S. Pat. No. 7,090,361 (Bundled light based alignment and maintenance tool for projection systems) provides an interface for user-assisted geometric registration; U.S. Pat. No. 6,999,133 (Digital correction module for video projector) and U.S. Pat. No. 6,695,451 (Multi-projector image display device) presents a method to correct the image for curved displays in real-time, both geometrically and photometrically, but assumes that the correction parameters are generated apriori by some registration technique; U.S. Pat. No. 6,793,350 (Projecting warped images onto curved surfaces) uses a stereo camera pair and structured light pattern to recover the screen geometry and subsequently register multiple projectors on it; U.S. Pat. No. 6,558,006 (image projection display apparatus using plural projectors and projected image compensation apparatus) uses markers on the display to aid in the process of recovering the shape of display surface;

Camera-based geometric registration of multi-projector displays can be either view-dependent or view-independent. View-dependent registration yields an image on the display that is correct from only one sweet view-point, usually the view of the camera. Deviation of the viewer from this location show view dependent distortions. Hence, view-dependent registration is usually appropriate for static single user applications. On the other hand, view-independent registration pastes or wall-papers the images on the display surface. Since wall-papering is a common way to accommodate multiple viewers, such registration can cater to more than one viewer easily. Such a registration not only requires registering the projectors in a common camera frame but also the (conformal) parameterization of the shape of the display surface.

BRIEF SUMMARY OF THE INVENTION

We present the first algorithm to geometrically register multiple projectors on a common type of curved surface, vertically extruded surface, using a single uncalibrated camera without attaching any obtrusive markers to the display screen. Further, our method can tolerate large non-linear geometric distortions in the projectors as is common when mounting short throw lenses to allow a compact set-up.

The illustrated embodiment of the invention is a new method to register multiple projectors accurately on an extruded surface using an uncalibrated camera. The illustrated embodiment of the method can also handle large non-linearities in the projectors, as is common when mounting short throw lenses for a compact setup. We impose two simple priors on the screen. First, the screen is a vertically extruded surface, namely a surface made by sweeping a line along a path curve in a direction perpendicular to it. This path curve can be smooth or piecewise linear. This covers a large number of shapes that can be built by soft folding of a rectangular sheet in one direction—cylinder is an example of surface generated from a smooth path curve, and the vertical walls of a room as is common in CAVE used for virtual reality environments. A Cave Automatic Virtual Environment (better known by the recursive acronym CAVE) is an immersive virtual reality environment where projectors are directed to three, four, five or six of the walls of a room-sized cube. Second, we assume the aspect ratio of the planar rectangle formed by the four corners of the extruded surface is known. Using these priors or constraints, we use a single image of the display surface from an uncalibrated camera to recover both the camera parameters and the three dimensional shape of the surface. The display surface is then arc length parameterized in both dimensions. Then we capture a few images of patterns from the projectors to relate the projector coordinates with the display surface points. This relationship is then used to segment the appropriate parts of the image for each projector to register them and create a seamlessly wall-papered projection on the display screen.

When using a smooth vertically extruded surface, we use a feature based pattern from each projector to find the projector to sensor correspondence. Then we use a smooth Bezier based function to relate the projector coordinates with the camera coordinates and hence the recovered display coordinates (achieved by arc length parametrization of the 3D path curve and the vertical line). Since we use a smooth function, this method cannot handle a extruded surface that has sharp vertical edges.

To handle extruded surfaces that are not restricted to have a smooth path curve, but can have a piecewise linear path curve leading to an extruded surface that has sharp vertical edges (as in CAVE™), we use a single line based pattern from the projector. By analyzing the captured images of these projected lines, we can auto-calibrate each projector, i.e. calculate its pose, orientation and intrinsic parameters like focal length and vertical offsets. For this, we do not make restrictive assumptions like square projector pixels and identical vertical shift for all projectors. Note that the method to recover the camera properties is same as in [15] and uses a single image of the display. The auto-calibration provides the correspondence between the projector coordinates and the 3D display coordinate which are used to register the projectors on the display. Once auto-calibrated, we achieve geometric registration on the display surface via a ray-casting method. In particular, unlike prior work on planar displays where the projector auto-calibration results from an involved optimization process, our projector auto-calibration is achieved by an efficient and fast deterministic algorithm. Hence, for static display surfaces, once the three dimensional display geometry is recovered, our auto-calibration method can be used for interactively changing the projector position and orientation to create displays of different scale, resolution and aspect ratio.

Since the 3D display shape is recovered, we can register the images in a manner that is wall-papered on the display or one that looks correct from any arbitrary viewpoint. The wall-papering though not correct from any single viewpoint, provides a way to present the image to multiple users. Though all users can perceive the distortion, they can correct for it since they are used to seeing such wall-papering in many public and private spaces. Hence, wall-papering is an easy way to present imagery to multiple users. On the contrary, when correcting from an arbitrary viewpoint, the image would look perspectively correct only from this view point. Both are valid registrations, their usage depending on the application. A multi-user map visualization may want to use a wall-papered registration. On the contrary, a 3D visualization application would want a head-tracked user and the imagery should be corrected from his specific viewpoint.

The purpose of the illustrated embodiment is to register images from multiple projectors on an extruded surface in the presence of severe projector nonlinearities. The illustrated embodiment has the advantages of:
a) Markerless: Using some simple priors on the display surface, we can register images from multiple projectors on a vertically extruded screen without using any physical markers on the display surface.
b) Uncalibrated Camera: We show that with some simplifying assumptions on the intrinsic parameters of the camera, we can achieve this registration using an uncalibrated camera.
c) Allowing Low-Resolution Sensor: Since we use a rational Bezier to relate the projector to the display parameters for a smooth extruded surface, we can achieve a good fit even if we sample the function sparsely. As a result, we can use a relatively low-resolution camera (e.g. VGA camera) to register a much higher resolution display. Even for extruded surface with corner, since we analyze the shape of a line rather than features, we can use a low-resolution camera.
d) Accuracy: Our method assures subpixel accuracy.
e) Efficiency: Finally, our method can be run in real-time on the GPU making it ideal for interactive video applications.

When dealing with smoothly extruded surfaces, our method provides two additional advantages. (a) Since our registration depends on a two dimensional parameterization of the display generated from the recovered three dimensional surface rather than auto-calibrating projectors on the three dimensional surface itself, we can handle severe non-linearities in the projectors (like radial distortion). Thus, we can allow a compact setup with inexpensive short-throw lenses mounted on the projectors that usually has non-linear distortions. Current systems can only use very expensive lenses where the non-linearities are corrected optically within the lens itself. (b) The two dimensional parameterization additionally assures that the deviation of the screen from being a perfectly extruded surface will not affect the accuracy of the geometric registration. Thus, we can handle manufacturing imprecision in the vertically extruded display surface The illustrated embodiments of the invention are further embodied in a method using the constraints of a vertically extruded surface and known aspect ratio, that estimates the display's three dimensional surface geometry and camera extrinsic parameters using a single image without any explicit display to camera correspondences. The method is applicable to any vertically extruded surface. Using the estimated camera and display properties, the method is used to recover the intrinsic and extrinsic parameters of each projector using a single projected pattern seen by the camera. The recovered projector parameters are then used to register the images from the multiple projectors to create a wall-paper projection, (i.e. pasting of the image on the display surface like a wall paper) or a projection correct from an arbitrary view point.

This is the first method that can achieve multi-projector registration on specialized non-planar displays which are vertically extruded surfaces (like a cylinder) without using any physical fiducials on the display surface or without the use of stereo cameras.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIGS. 4a-4e are images used for registering a cylindrical display with 2×4 array of eight projectors in a wall-papered fashion. FIG. 4a is the image of the screen with no projectors turned on, used for recovering the camera and the display properties. FIGS. 4b-4e are the four different images of blobs from non-overlapping projectors used to find the projector to display correspondences.

FIG. 5 is a flow diagram of the method of the illustrated embodiments for registering projectors on a smooth vertically extruded surface.

FIGS. 6a-6d illustrate the geometric registration on two different extruded surfaces FIGS. 6a, 6b on one hand and FIGS. 6c, 6d on the other, created a general smooth vertically extruded display set-up when using 2×3 array of six projectors. FIGS. 6a and 6c show the casually aligned geometrically misregistered set•up and FIGS. 6b and 6d show the wall papering of images after our registration is used.

FIG. 8 shows the non-linearities common in projectors either due to their commodity nature or due to mounting of a short throw lens. FIG. 8a illustrates a barrel distortion of degree 2. FIG. 8b illustrates a combination of a pin cushioning of degree 2 and a first order tangential distortion.

FIGS. 9a-9d illustrate our geometric registration handling severe nonlinear distortion on an general extruded surface when using 2×3 array 6 projectors•FIGS. 9a and 9c show the casually aligned set•up and FIGS. 9b and 9d show the wall papering of images after our registration is used. FIGS. 9a and 9b illustrate severe barrel distortion. FIGS. 9c and 9d severe pin•cushioning and tangential distortion.

Figure 11:
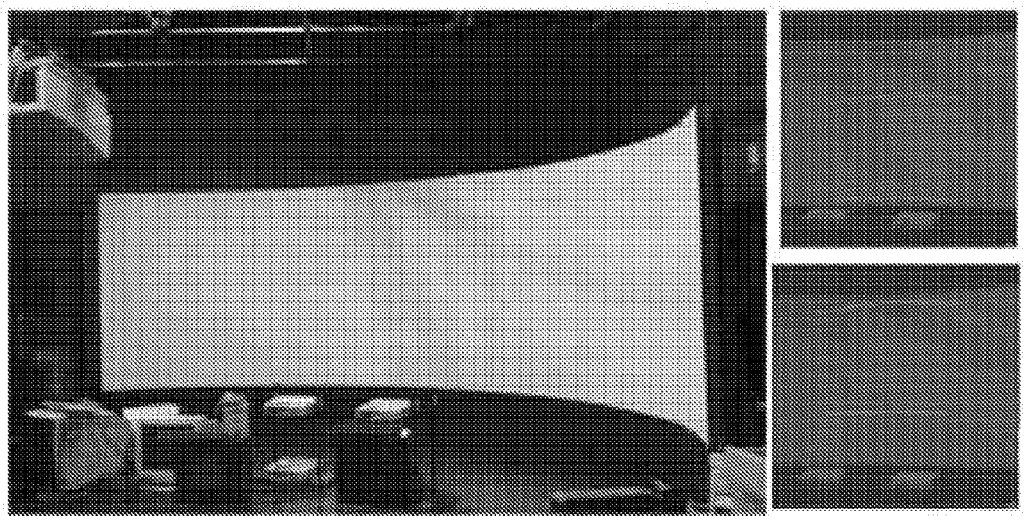

The left image in FIG. 11 is the single photograph of the display from which the camera properties are estimated. The two right images are the single line-based image projected by two different projectors which are then captured by a camera and subsequently used for auto-calibration.

Figure 12:
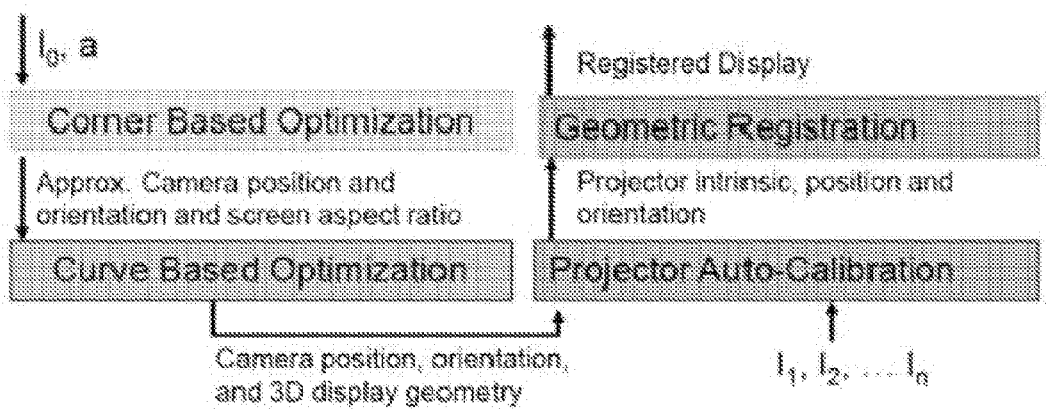

FIG. 12 is a flow chart of the auto-calibration method of the illustrated embodiments.

Figure 13:
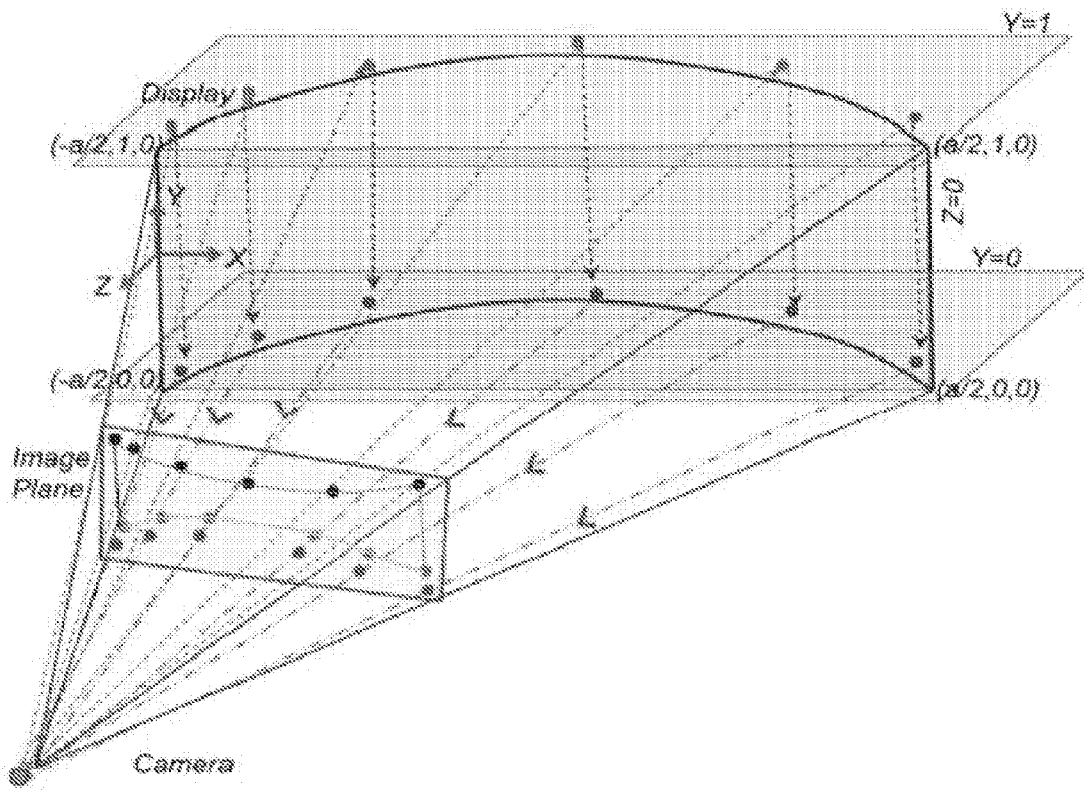

FIG. 13 is a curve fitted through the sampled points on the two dimensional bottom curve. The sampled points on the two dimensional top curve in the camera are reprojected in three dimensions to estimate the three dimensional top curve, and translated down to estimate the three dimensional bottom curve and finally projected back on the camera. The distance between these points and the purple curve is minimized in the curve based optimization step.

Figure 14:
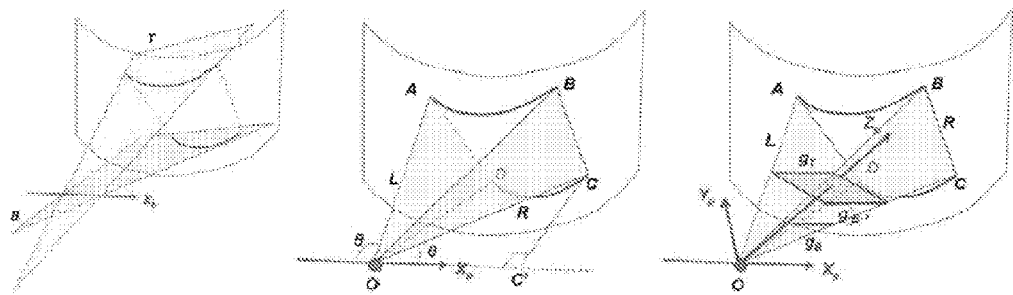

FIG. 14 are illustrations demonstrating the methods to find (a) a line $X_p$ passing through the center of projection of the camera and parallel to the X axis of the cameras's local coordinate system, (b) the center of projection O of the camera, and (c) and the local coordinate system of the camera given by $X_p$, $Y_p$ and $Z_p$.

Figure 15:
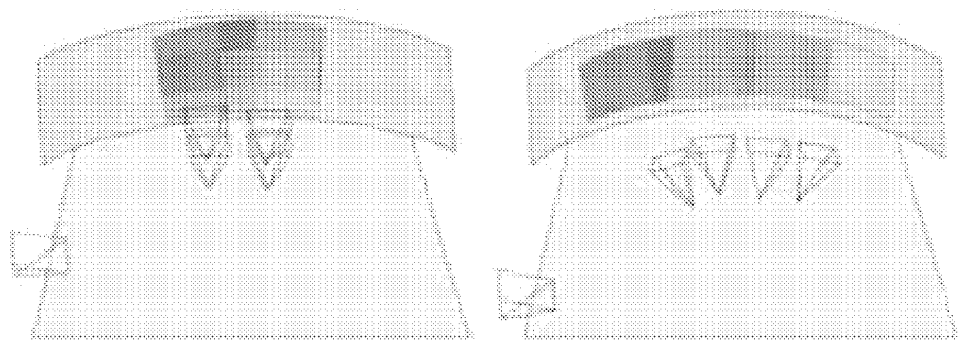

FIG. 15 illustrates the estimated camera, projector parameters and the 3D recovered shape of the display using our auto-calibration algorithm for the 2×2 array and 1×4 array of four projectors.

Figure 16:
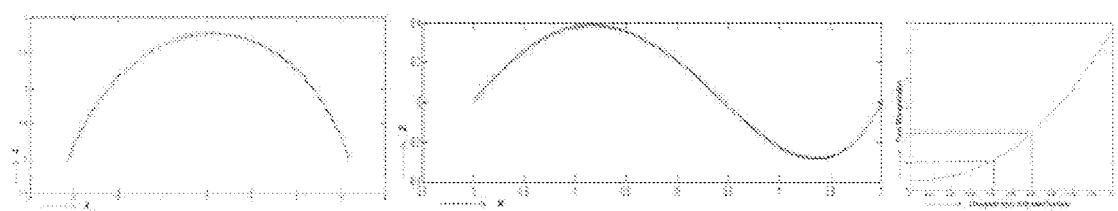

FIG. 16 on the left depicts in the real system the estimated three dimensional red and blue top and bottom curves of the display. In the middle in simulation. the blue curve is the original display surface curve and the red curve is the estimation provided by our method. On the right the plot shows the pixel misregistration as the surface deviates from being an extruded surface. This shows that if we assume a roughly tiled configuration and can tolerate 1 or 2 pixel misregistration, we can tolerate considerable deviation from the vertically extruded surface.

Figure 17:
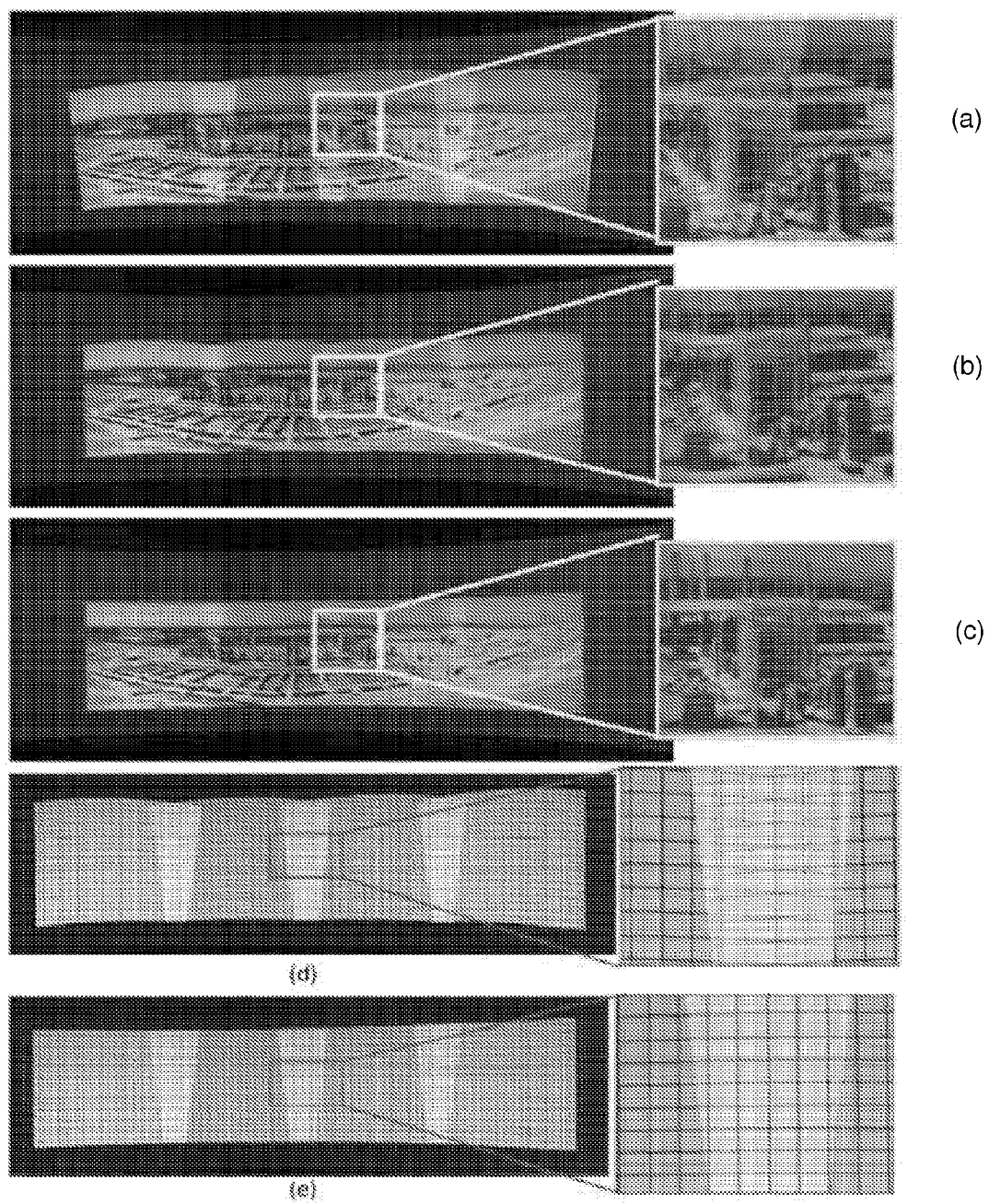

FIG. 17 depicts two images that show our geometric registration (c, e) for the panoramic configuration and compares it with a homography based registration (b, d) for Persepolis and the grid images. In addition, we show a naive method to cut up the image given the estimates of the overlap region for the Persipolis image (a) and compare it with our method (c).

Figure 18:
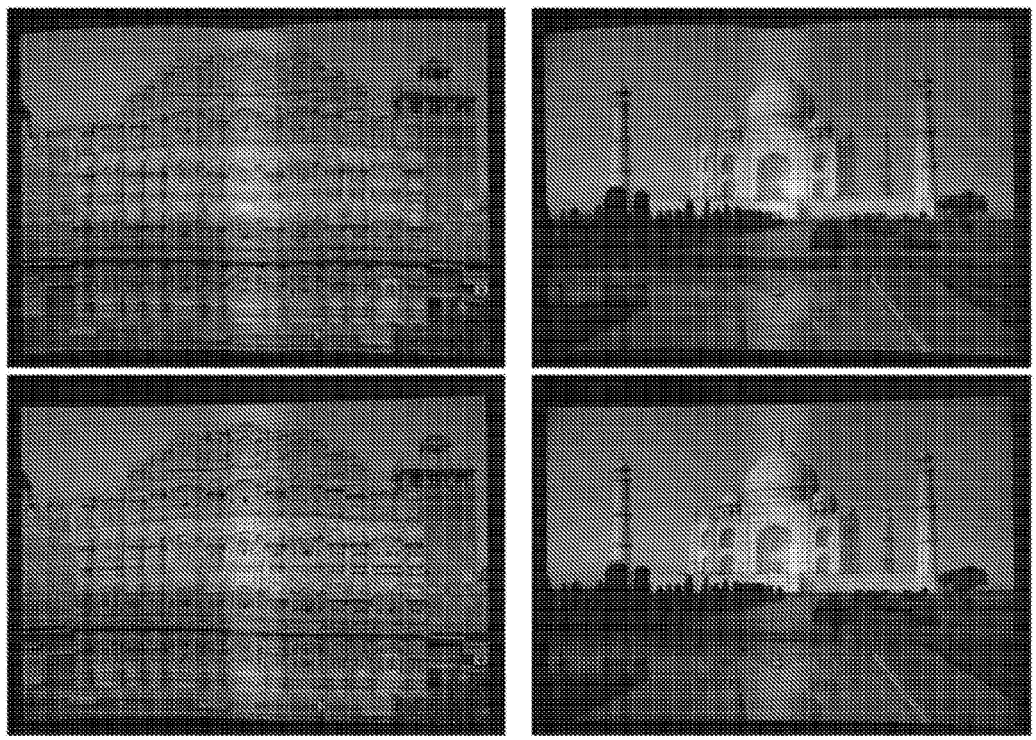

FIG. 18 depicts on the top row geometric registration on our 2×2 projector display using homography. In the bottom row the same image is depicted using our algorithm. The center of the left image (four projector overlap) shows severe misregistrations. The pedestal at the peak of the Taj Mahal on the right clearly illustrates the severe misregistration due to homography based method.

Figure 19:
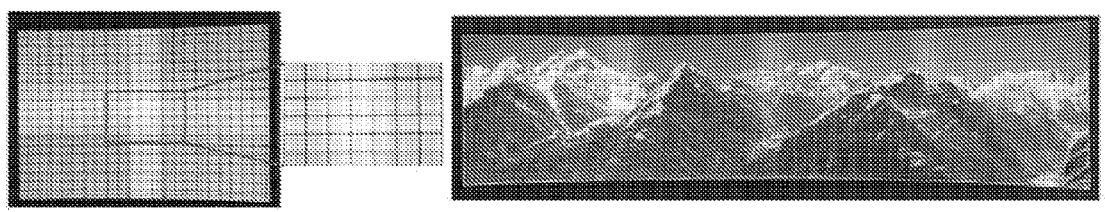

FIG. 19 on the left depicts the quality of our registration in a four projector overlap region when projecting a content of single pixel grids. On the right is a registered and wall papered panorama of the Himalayas in the panoramic setup.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

In this disclosure, we present the first algorithm to geometrically register multiple projectors on a common type of curved surface, vertically extruded surface, using an uncalibrated camera without attaching any obtrusive markers to the display screen. The registration can be a wall-papered one or can be correct from an arbitrary viewpoint. Further, it can also tolerate large non-linear geometric distortions in the projectors, when using smooth display surfaces. Such non-linearities are common when mounting short throw lenses to allow a compact set-up. Our registration achieves sub-pixel accuracy on a large number of different vertically extruded surfaces and the image correction to achieve this registration can be run in real time on the GPU. This simple markerless registration has the potential to have a large impact on easy set-up and maintenance of large curved multi-projector displays common for visualization, edutainment, training and simulation applications.

Figure 2:
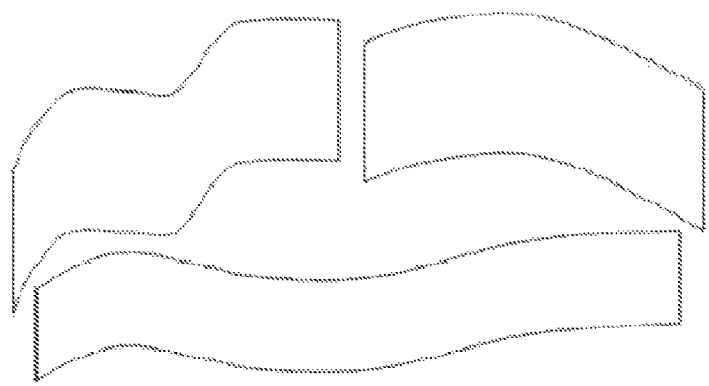
FIG. 2 is a depiction of some examples of vertically extruded surfaces.

We observe that most of the time, geometrically simple surfaces like a partial cylinder (like pillars and surround immersive environment) are used as the display screen. So we impose two simple priors or constraints on the screen. First, the screen is a vertically extruded surface, namely a surface made by sweeping a line along a curve called a path curve in a direction perpendicular to it. This covers a large number of shapes that can be built by soft folding of a rectangular sheet in one direction as illustrated in FIG. 2. A cylinder is just one of them. Second, we assume the aspect ratio of the planar rectangle formed by the four corners of the extruded surface is known. Such a measurement is easy to provide, even for a layman user. Having these priors allows us to prevent the use of any markers on the display screen and still recover the shape of the display using one image from a single uncalibrated camera. This allows easy set-up and maintenance of such multi-projector displays by the user, even in the face of changes in the display surface or projector configurations and severe non-linearities.

In this disclosure we present an efficient algorithm to register images from multiple projectors on a vertically extruded surface. Using the priors of an extruded shape and the known aspect ratio, we use a single image of the display surface from an uncalibrated camera to recover both the camera parameters and the three dimensional shape of the surface. We then present two methods to register images on multiple projectors on this display. In the first, we assume a smooth extruded surface by assuming a smooth path curve. We find a 2D parametrization of the recovered 3D display. Then we capture a few images of patterns from the projectors to relate the projector coordinates with the 2D display parameters, and represent this relationship using a rational Bezier patch. This relationship is then used to segment the appropriate parts of the image for each projector to register them and create a seamless display. We can wall-paper the image on the display screen making it appropriate for multiple users or perspectively correct from an arbitrary viewpoint making it appropriate for a single head tracked user. In the second method, we do not restrict the surface to be smooth. It can be a piecewise planar extruded surface achieved by assuming a piecewise linear path curve. In such cases, we achieve the registration by auto-calibrating the projectors and then finding a relationship between the 2D projector coordinates and the 3D display coordinates. In this case, we cannot handle distorted projectors and can only achieve a registration that is correct from an arbitrary viewpoint.

This is the first work that can achieve the following many desirable qualities of geometric registration on these non-planar surfaces.

a. Markerless: Using some simple priors on the display surface, we can register images from multiple projectors on a vertically extruded screen without using any correspondence between the three dimensional display and the camera.

b. Uncalibrated Camera: We show that with some simplifying assumptions on the intrinsic parameters of the camera, we can achieve this registration using an uncalibrated camera.

c. Allowing Non-Linearities for Smooth surfaces: Since our registration depends on a two dimensional parameterization of the display generated from the recovered three dimensional surface rather than auto-calibrating projectors on the three dimensional surface itself, we can handle severe non-linearities in the projectors (like radial distortion). Thus, we can allow a compact set-up with inexpensive short-throw lenses mounted on the projectors that usually has non-linear distortions. Current systems can only use very expensive lenses where the non-linearities are corrected optically within the lens itself.

d. Allowing Display Imprecision for Smooth Surfaces: The two dimensional parameterization additionally assures that the deviation of the screen from being a perfectly extruded surface will not affect the accuracy of the geometric registration. Thus, we can handle manufacturing imprecision in the vertically extruded display surface.

e. Allowing Low-Resolution Sensor: Since we use a rational Bezier to relate the projector to the display parameters, we can achieve a good fit even if we sample the function sparsely. For auto-calibration since we analyze the image of a line, sparse sampling can be used. As a result, we can use a relatively low-resolution camera (e.g. YOA camera) to register a much higher resolution display.

f. Accuracy: Our method assures subpixel accuracy.

g. Efficiency: Finally, our method can be run in real-time on the graphic processor unit (GPU) making it ideal for interactive video applications.

Figure 3:
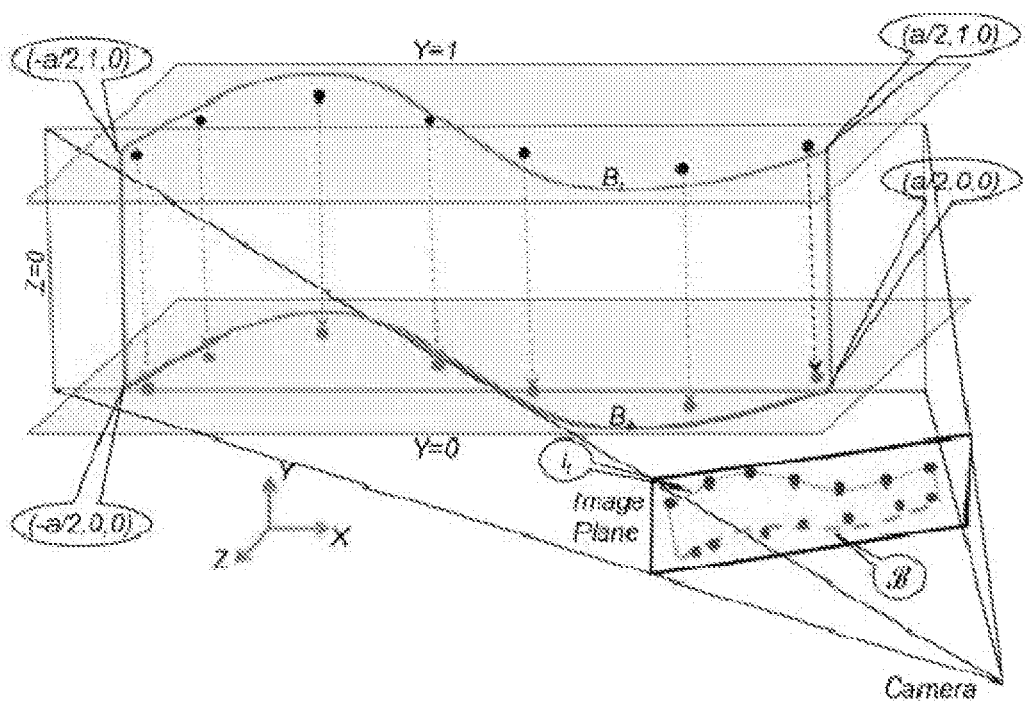
FIG. 3 illustrates the world coordinate systems and the display surface and camera set•up with respect to it. The sampled points on the two dimensional top curve in the camera (blue) is reprojected in to estimate the three dimensional top curve (black). and translated down to estimate of the three dimensional bottom curve (purple), and finally projected back on the camera (red). The distance between these points and the orange curve on the camera image plane, B is minimized in the extrusion based optimization step.

Turn now and consider the algorithm used in the illustrated embodiments. Let the display surface, the image planes of the camera and the projector be parameterized by $(s, t)$, $(u,v)$ and $(x, y)$ respectively. We denote the three dimensional coordinates of the point at $(s, t)$ in the display by $(X(s, t), Y(s, t), Z(s, t))$. Since the display is a vertically extruded surface, the four corners of the display lie on a planar rectangle, whose aspect ratio, a, is known. We define the world three dimensional coordinate with Z axis perpendicular to this plane and X and Y defined as the two orthogonal basis of this planar rectangle. We also consider this planar rectangle to be at $Z=0$. Considering these three dimensional coordinates, the top and bottom curves of the surface lie respectively on $Y=1$ and $Y=0$ plane in three dimensional. Hence. $Y(s, 0)=0$ and $Y(s, 1)=1$. Further. these two curves are identical except for a translation in the Y direction. Hence, for all s $(X(s, 0), Z(s, 0))=(X(s, 1), Z(s, 1))$. This is illustrated in FIG. 3. We assume that our camera is a linear device without any radial distortion. Note that our projectors need not be linear devices.

A geometric registration essentially requires us to define a function from $(x, y)$ projector coordinates to the $(s, t)$ display coordinates. Our method follows three steps to achieve this (FIG. 5). First we use a single image of the display from the uncalibrated camera and the known aspect ratio of the display to recover the camera properties (intrinsic and extrinsic parameter matrices) using a nonlinear optimization. Using the estimated camera parameters, we next recover the three dimensional shape of the display. Then, we use the path curve of the vertically extruded surface to define two dimensional parameterization of the display surface based on the arc length of the profile curves flanking the display. Finally, we capture the image of a blob-based pattern from each projector and use them to find samples of the mapping from the projector $(x,y)$ to the display $(s, t)$. Then we approximate this mapping from these samples by fitting a rational Bezier to the correspondences.

In an alternate embodiment, we use a deterministic method to auto-calibrate the projectors once the camera parameters and the 3D display shape is recovered. This provides us a way to map the projector coordinates directly to the 3D display coordinates (instead of their 2D parameterization). This helps us to avoid the smooth Bezier mapping that assumes a smooth extruded surface. Hence, this alternate method also works on piecewise planar extruded surface.

For wall-papering an image on smooth surfaces, we relate the projector coordinates to the image coordinates assuming the image to be pasted on the display resulting in the image coordinates being identical to the display coordinates $(s, t)$. This automatically achieves the geometric registration by defining the part of the image to be projected by each projector so that the resulting display is seamlessly wallpapered. Each of the above four steps is described in detail below.

Turn and consider the step of recovering camera properties. In this step, we use a single image of the display surface (FIG. 4) to recover the intrinsic and extrinsic parameters of the observing uncalibrated camera using a non-linear optimization. A large number of image formats like jpg or tiff store EXIF tags for images which provide some of the camera settings parameters used during the capture. One of these is the focal length of the camera, the critical complement for the intrinsic parameter matrix of the camera. We use this focal length to initialize the intrinsic parameter matrix in our non-linear optimization. To convert the focal length to the unit of pixels, we divide resolution of the camera by the CCD sensor size and multiply it with the focal length specified in the EXIF tags. The sensor size of the camera is available in its specifications.

In most cameras today, it is common to have the principal center at the center of the image, no skew between the image axes and square pixels. Using these assumptions, we express the intrinsic parameter matrix of a camera, $K_c$, as $$K_c = \begin{pmatrix} f & 0 & 0 \\ 0 & f & 0 \\ 0 & 0 & 1 \end{pmatrix} \quad (1)$$

The camera calibration matrix that relates the three dimensional coordinates with the two dimensional camera image coordinates (u, v) is given by $M=K_c[R|RT]$ where R and T are the rotation and translation of the camera with respect to the world coordinates system. In this step, we use the initial estimate of f and the aspect ratio a as input and use a non-linear optimization to estimate seven parameters of the camera calibration matrix—these include the focal length f, the three rotations that comprise R and the three coordinates of the center of projection of the camera T.

Our non-linear optimization has two phases. In the first corner-based optimization, the seven camera parameters are estimated using just the projection of the corners of the display surface on the camera image. These estimates are used to initialize the curve based optimization with a more expensive error function to refine the camera parameters.

Consider now the corner based optimization. We refine the seven parameters in this step based on the image of plane formed by the four corners of the screen whose three dimensional coordinates are given by: (−a/2, 1, 0), (a/2, 1, 0), (a/2, 0, 0), and (−a/2, 0, 0). Consequently, the (u, v) coordinates•in the camera of any three dimensional point (X(s, t), Y(s, t), Z(s, t)) on the display are given by $$(uw, vw, w)^T = M(X(s,t), Y(s,t), Z(s,t), 1)^T \quad (2)$$

where $(uw, vw, w)^T$ is the three dimensional homogeneous coordinates corresponding to the camera coordinate (u, v) and M is the 3×4 camera calibration matrix defined by the seven camera parameters. We estimate the seven camera parameters in this step by using a non-linear optimization method that minimizes the reprojection error $E_r$ (i.e. the sum of the distances of the projection of these three dimensional corners on the camera image plane from the detected corners). We initialize the angle of rotations about the X, Y and Z axes that comprise R to zero and T to be roughly at the center of the planar rectangle followed by the four corners of the display at a depth of a similar order of magnitude as the size of the display i.e. to (0, 0,a).

Consider now curve based optimization. The estimated seven camera parameters in the plane based optimization is used to initialize the extrusion based optimization that attempts to refine these parameters further. This also uses a non-linear optimization method that minimizes the error $E=w_r E_r+w_c E_c$, where $E_r$ is the error function from the plane based optimization step, and $E_c$ is an error function based on the reprojection error in the similarity of the flanking curves of the display as described next, and $w_r$, and $w_c$ are the weights to combine them.

The vertically extruded display surface is constrained by the fact that the points on the top curve of the vertically extruded surface when translated by Y=−1 should lie on the bottom curve. We use the deviation from this constraint to define $E_c$. Let the image of the top and bottom boundaries of the vertically extruded display in the camera be $I_t$ and $I_b$ respectively. We first use image processing to segment the image and sample the curves $I_t$ and $I_b$. We fit a parametric curve to the samples on $I_b$. Let us denote it with B. We use the current estimate of M to reproject $I_t$ in three dimensions. This is achieved by ray casting through the sampled points on $I_t$ and intersecting it with Y=1 plane. The three dimensional curve thus obtained is $B_t$. Then we translate the samples on $B_t$, along Y direction by 1 to get the samples on the three dimensional bottom curve, $B_b$. Then we project these samples back on to the camera using M. denoted by $M(B_b)$. The distance of these samples from the curve B provides the reprojection error of the estimated bottom curve from the detected bottom curve. In case of perfect estimation. this error should be zero. Hence. we seek to minimize $E_c$ in addition to $E_r$. The novelty of this step is to estimate the camera parameters and the three dimensional display geometry from a single image without using any correspondences. The correspondences are avoided by exploiting the fact that the top and the bottom curves of the display are identical except for being in two different XZ planes in three dimensions. To solve both the corner and curve based optimizations we use standard gradient descent methods.

Turn now to the step of recovering three dimensional display parameters. After convergence of the optimization process, we use the estimated M to reproject samples on $I_t$ and $I_b$ in three dimensions and intersect it with Y=1 and Y=0 planes to find $B_t$ and $B_b$ respectively. Due to accumulated errors, $B_t$ and $B_b$ may not be identical. So, we translate both the curves on Y=0 plane and find their average to define the $B_b$. This is then translated to Y=1 to define $B_t$. This assures that both $B_t$ and $B_b$ are identical except for a translation along Y. We use a polynomial curve filling to find a parametric representation of $B_t$ and $B_b$.

Next, for smooth surfaces, we seek a two dimensional parameterization of the display D with (s, t). The profile curve $B_b$ on the XZ plane is arc length parameterized using the parameter s. Considering the three dimensional point (X, Y, Z) on the display surface, $X=X(s•,t)=X(s)$ and $Z=Z(s, t)=Z(s)$. Since extrusion is along the Y direction, $Y=Y(s, t)=t$. Since this is a vertically extruded surface, X and Z are independent of t and Y is independent of s.

Consider now geometric registration. Geometric registration entails defining for each projector a function that maps the projector coordinates (x, y) to the display coordinates (s, t) via the camera coordinates (u, v). Mathematically, $$(s,t) = M_{D \leftarrow C}(M_{C \leftarrow P}(x,y)) \quad (3)$$

where $M_{C \leftarrow P}$ maps the (x, y) to (u, v) and $M_{D \leftarrow C}$ maps (u, v) to (s, t). We use a rational Bezier to define $M_{C \leftarrow P}$. To find $M_{C \leftarrow P}$ we project a number of blobs and use the camera to capture it (FIG. 4). The center of these blobs are known in the projector coordinate space (x,y). When these centers are detected in the camera space (u, v), it provides direct correspondence between (x, y) and (u, v). To compute $M_{D \leftarrow C}$ we do the following. For every mapped (u, v) coordinate in the camera, we cast a ray through this point and find the point of intersection with the recovered three dimensional display. Then we find the two dimensional parameter (s,t) corresponding to this three dimensional point. We fit a rational Bezier using a non-linear least squares filling solved efficiently by Levenberg-Marquardt gradient descent optimization technique to relate the projector (x,y) to the display (s,t).

Using a rational Bezier provides two important capabilities to our algorithm in smooth extruded surfaces. First, we can achieve accurate registration in the face of severe non-linear distortions like lens distortion (barrel, pin-cushion, tangential and so on). Such distortions are common when using inexpensive short throw lenses on projectors to allow a compact setup. The rational Bezier in this case can represent the non-linearities both due to the curved nature of the display and projector non-linearities. Second, the rational Bezier can be estimated accurately even from a sparse sampling of the correspondences. This allows the use of the low resolution camera to calibrate a much higher resolution display. For example. we can achieve calibration on a 3000×1500 display using a YGA camera (640×480). Though these two capabilities have previously been demonstrated for planar displays, we demonstrate it for the first time for a class of non-planar displays.

Assuming that our image is pasted on the display and hence the image coordinates is identical to 2D display parametrization (s,t), $M_{D \leftarrow C}$ provides us a way to wall paper the image in an seamless manner across multiple projectors.

To accommodate a perspectively correct image from an arbitrary view point, the image coordinates of the 3D scene rendered from a virtual camera should be related to (s,t) using a projective texture.

We have implemented our method in MATLAB for two types of displays. First, we have used a large rigid cylindrical display, namely an extruded surface with a radius of about 14 feet and an angle of 90 degrees. Since cylinder is an extruded surface our method is applicable. We tiled eight projectors in a casually aligned 2×4 array to create the display. Second, in order to demonstrate the success of our method on a large number of vertically extruded shapes, we made a flexible display using a rectangular sheet of flexible white styrene. This was supported by five poles to which the styrene sheet was attached (FIGS. 6 and 9). The shape of the profile curve of this extruded display can be changed, by simply changing the position of the poles. Thus, we can create a large number of extruded shapes. We use six projectors on this display in a casually aligned 2×3 array to create the tiled display. For all the setups. we use Epson 1825p projectors ($600). We use a Canon Rebel Xsi SLR camere ($800) as our sensor. For color calibration we use a simple edge blending, since this is not the focus of this work. The color seamlessess can be improved by using known more sophisticated methods.

FIG. 4 shows the single image used to recover the camera and display properties. To find the projector to camera correspondence, we display a rectangular grid of Gaussian blobs whose projector coordinates are known. These are then captured by the camera. We use a two dimensional stepping procedure where the user identifies the top-left blob and its immediate right and bottom neighbors in camera space. Following this, the method (a) estimates the rough position of the next blob in scan-line order, and (b) searches for the correct blob position using the nearest windowed center-of-mass technique. If this is not possible for extreme projector/screen distortions, one can binary-encode the blobs and project them in a time sequential manner to recover the exact ids of the detected blobs and find the correspondences (FIG. 4).

Our projectors have relatively large throw-ratios and hence do not reveal major lens distort ions. To demonstrate the capability of our method to handle non-linearities, we chose to simulate the distortion digitally by distorting the input images to the projectors. Such distortions will be common when mounting inexpensive short throw lens on the projector to create a compact setup.

Turn now to real time image correction that can be achieved by a GPU or a special purpose hardware. The registration is done offline. This generates the rational Bezier B(x,y)=(u, v) for each projector, which are then used for image correction. We have implemented the real-time image correction algorithm using current GPUs through Chromium, which is an open-source distributed, rendering engine for PC clusters. A module for Chromium is written that first precomputes the coordinate-mappings of all pixels using the rational Bezier parameters. This per-pixel projector to screen lookup table is used by a fragment shader to map pixels from the projector coordinate space to the screen coordinate space during rendering.

Figures 1A, 1B:
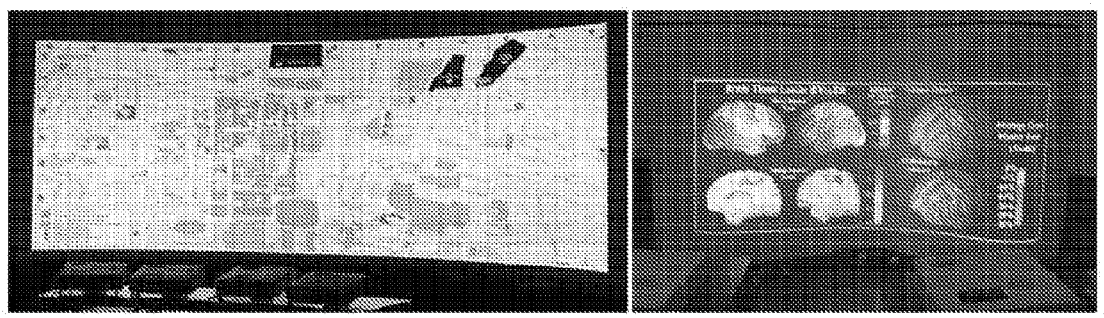
FIG. 1a illustrates a 2×2 array of eight projectors registered in a wall-papered manner on a smooth cylindrical display surface showing a weather map visualization.
FIG. 1b illustrates a 2×3 array of six projectors on a more general smooth extruded surface registered in a wall-papered manner showing a medical visualization.
Figures 7A, 7B, 7C:
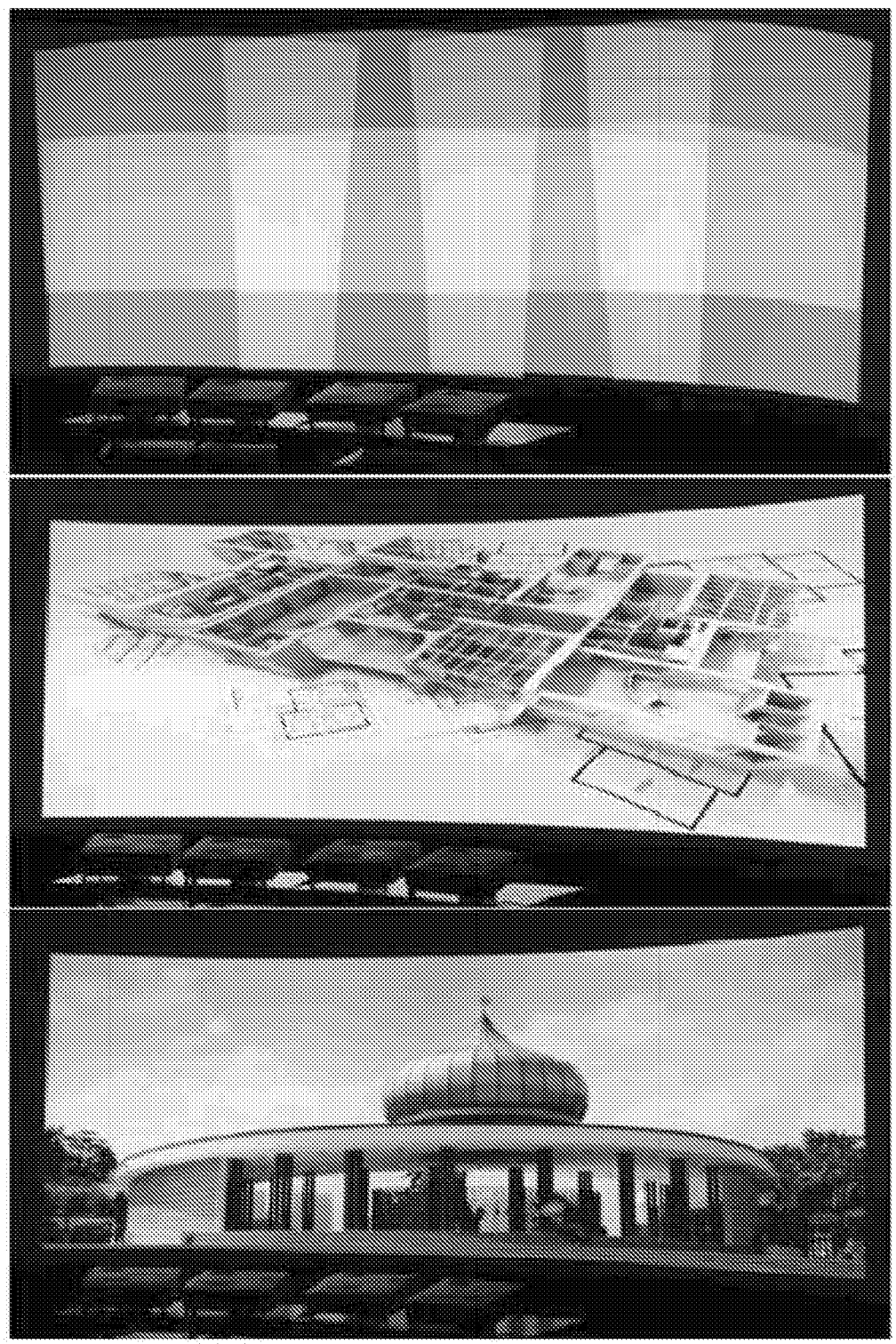
FIGS. 7a-7c illustrate our wall-papered geometric registration on a cylindrical display using 2×4 array of eight projectors.
Figure 10:
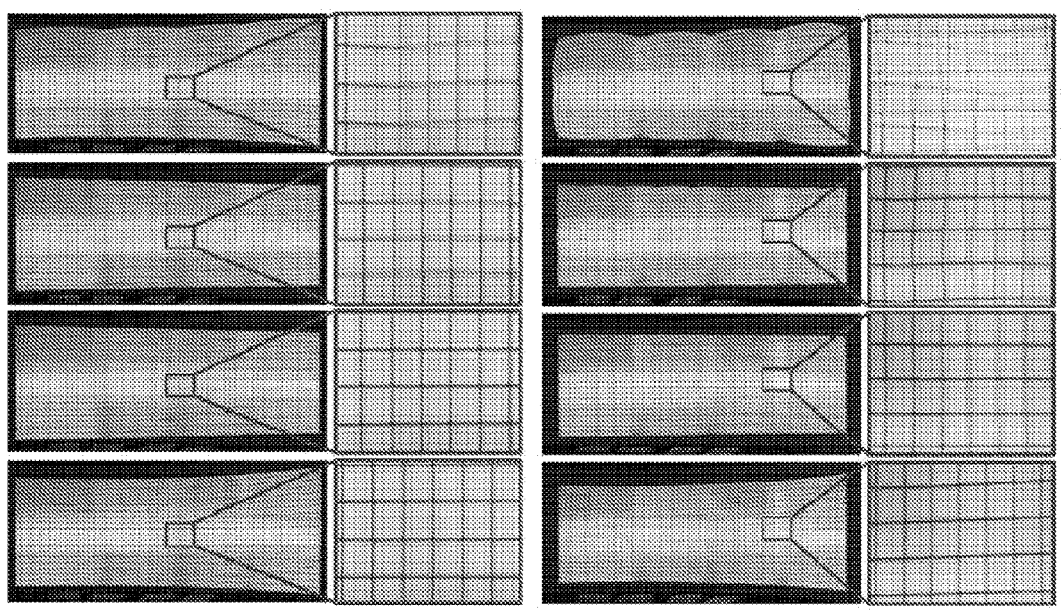
FIG. 10 illustrates a comparison of our method with other methods • From top to bottom of FIG. 10: Using simple homography: Using a piecewise linear representation of the projectors in the camera coordinate system and registering all projectors in this common camera space. This view dependent piecewise linear method with a sparse 4×5=20 projector to camera correspondences. •Note the misregistration since sparse samples are inadequate for a piecewise linear representation. Using dense 10×12=120 projector to camera correspondences to find the piecewise linear representation. Note that though the misregistrations have disappeared, the perspective projection of the camera embedded in the display shown by the more stretching on the left side than on the right. Our method using a sparse 4×5=20 projector to camera correspondences; note the perfect wall papering and the equal or higher quality of registration than the piecewise linear method despite the sparse sampling.

FIGS. 1, 6 and 7 show the result of our method on different extruded surfaces including the most common case of a cylindrical surface. We demonstrate our results on particularly challenging contents like text, especially for visualization applications and show accurate geometric registration. FIG. 9 demonstrates that our method can handle severe projector non-linearities enabling mounting inexpensive short throw lens for compact set-up. FIG. 8 shows the two distortions we used in our experiments. The degree of the rational Bezier used to achieve geometric registration depends on the amount of non-linearities present due to the curved screen and the distortions in the projectors. In our set-ups, we used bicubic rational Bezier for the cylindrical surface. For our flexible display, we use a rational Bezier of degree 5 and 3 in horizontal and vertical directions respectively. With large projector distortions and larger curvature to the display, higher order rational Beziers will be more appropriate. In FIG. 10. we compare our method with three different methods. Since our work is the only work that can achieve a markerless and view-independent registration, probably the only fair comparison is with using a homography-based registration that assumes a piecewise planar display surface and uses a homography tree to register all the projectors. However. in FIG. 10 we also show comparisons with the method that achieves a registration from the viewpoint of the calibrating camera by representing the projector as a piecewise linear function in the camera space. This defines a mapping from projector (x,y) to the camera coordinates (u, v) as opposed to display (s, t). Hence, Equation 3 becomes $$(u,v) = (M_{C \leftarrow P}(x,y)). \tag{4}$$

Hence, the distortions of the camera (like the perspective projection) embeds itself in the registered display. Further, this method uses a piecewise linear mapping for $M_{C \leftarrow P}(x, y)$ that requires a dense sampling of projector-camera correspondences than our method. Hence. in the face of severe distortion, even with an order of magnitude higher number of samples, it cannot achieve the accuracy of registration achieved by our method.

Consider the dependency of our method on various parameters like the camera position, precision in the display surface, and the degree of the rational Bezier. Turning first to camera placement our method achieves markerless registration on extruded surface using an uncalibrated camera. Even in the presence of the priors on the display surface there is a set of camera positions that will lead to degeneracy for one or both phases of our non-linear optimization.

If the camera is placed with the image plane parallel to the planar rectangle defined by the extruded surface on the Z-axis, moving the camera on the Z-axis can create the similar change as scaling its focal length and we cannot find a unique solution to the camera parameters. Hence, this camera placement should be avoided. Further if the camera placement is such that the images of these two top and bottom curves, $I_t$ and $I_b$ respectively are related by $I_t = I_b + (0, k)$ where k is a translation in the vertical image direction, then the extrusion based optimization will be redundant. This camera placement occurs when the normal to the camera image plane lies on a plane parallel to the XZ plane i.e. is perpendicular to the Y-axis. Hence, these camera placements should also be avoided. Note that the former placement that resulted in the scale factor ambiguity is contained in this latter condition since Z-axis is on the XZ plane. Hence, as long as a camera placement where the normal to the image plane is parallel to the XZ plane is avoided, our optimization will yield accurate solution.

In summary, we have disclosed a method for markerless registration of tiled projection-based displays on extruded surface using an uncalibrated camera. We have shown that by imposing practical constraints on the display surface. The registration technique can be simplified to be easily used by layman users. Our method provides a very user-friendly and cost-effective way to sustain such displays in large establishments like visualization centers, museums, theme-parks. Further, they also offer the ability of recalibration and reconfiguration at a very short notice. These can be especially useful for applications like digital signage and aesthetic projections like in malls, airports and other public places. It is within the scope of the invention that a similar concept of using practical priors will lead to easier registration for a different kinds of widely used non-planar surfaces, e.g. the domes, or swept surfaces. In the recent years, the number of domes have surpassed the number of IMAX theater installations. However, there still does not exist an easy way to calibrate these displays. The scope of the invention includes an extension to these types of surfaces. Further, if the display is too big to be seen by a single view from the camera, one can consider multiple views from the camera to register projectors on it. The scope of the invention includes extensions to these kinds of scenarios.

Turn now and consider the embodiments of the invention in which auto-calibration are employed to remove the restriction of smoothness of the path curve and hence the extruded surface. Assume that both cameras and projectors are linear devices with no radial distortion. Projectors are considered dual of a pin-hole camera. After recovering camera and display properties from a single image as mentioned before, we find the intrinsic and extrinsic parameters of each projector using a single image from each projector, thus auto-calibrating the projectors. For this we use a deterministic algorithm which is fast and efficient enabling interactive changes in projector properties (position. orientation, zoom). Finally, we use the recovered projector properties to register images seamlessly on the display in a perspectively correct manner from an arbitrary viewpoint. The complete pipeline of our method is illustrated in FIG. 12.

Turn now to the step of projector auto-calibration. In this step, we project a pattern from each projector comprising of a top and bottom line. An image $I_i$ of this pattern from projector i is captured by the camera. Using $I_i$ and the estimated camera calibration parameters and three dimensional display geometry, we estimate the intrinsic and extrinsic parameter of each projector.

Let the image of the top and bottom line for the projector in $I_i$ be denoted by $I_T$ and $I_B$ respectively. Let the end of the lines be denoted by $b_A$, $b_B$, $b_C$ and $b_D$ from the top left corner in a clockwise manner (FIG. 11). Note that though these lines are straight in the projector space, they look curved in three dimensions due to projection on a curved surface. The auto-calibration of each projector is comprised of two steps. First, we find the view frustum of the projector defined by its center and five planes (top, bottom, left, right and the image plane) that defines the extrinsic parameters of the projector. Next we use this view frustum and the known projector resolution (W×H) to recover its intrinsic parameters. Most projectors have a vertical principle center offset to avoid occlusion with the table or the ceiling where me projector is mounted. This results in an offset in the y-direction for the principle center. We assume that the x-coordinates of principle center coincides with the center of the x-direction. Additionally we do not consider any skew. This results in a simplified intrinsic parameter matrix $K_p$ for projectors given by $$K_p = \begin{pmatrix} f_x & 0 & 0 \\ 0 & f_y & o_y \\ 0 & 0 & 1 \end{pmatrix}$$

When recovering the projector intrinsic parameters, we determine for each projector these three parameters, the focal lengths in the two image coordinate directions ($f_x$ and $f_y$) and the offset in the y direction ($o_y$). Our method is absolutely deterministic without using any optimizations and hence is accurate and efficient.

Turn to the step of estimating extrinsic parameters. Let us consider a three dimensional local coordinate frame for each projector defined by the COP 0 (position) and axes $X_p$, $Y_p$ and $Z_p$ (orientation). We use a three step procedure to reconstruct the view-frustum of the projector. (a) First, we find a line that is parallel to $X_p$ and passes through O. (b) Second, we find position of the center of the camera on $X_p$. (c) Finally, we recover the other local coordinate axes $Y_p$ and $Z_p$.

Turn to the step of finding $X_p$. We first cast rays from the camera center of projection through the image of the top and bottom projected curves and intersect then with the recovered 3D display to find the corresponding 3D curve. Note that these curves will be planar and we estimate the plane on which these curves lie to get the top and bottom plane of the view frustum. The line of intersection of these two planes is the line on which the center of projection will fall. To find this we use an angular constraint that the projector view frustum is symmetric in the horizontal direction and the center O is a point on the line $X_p$ constrained by the fact that the two vertical planes formed by the view frustum, should make the same angle with the line $X_p$ (FIG. 14) and can be found deterministically. We have now found the four lateral planes of the projector view frustum. Now, we want to find the view direction $Z_p$. Note that for any plane P perpendicular to $Z_p$ the length of the intersections of P in the top and bottom are equal (FIG. 14). We use this constraint of equal length to find $Z_p$. $Y_p$ is given by $X_p \times Z_p$.

Turn now to the step of estimating intrinsic parameters. Let the resolution of the projector between the four end of the top and bottom lines in the pattern be P×Q. To find $f_x$ and $f_y$ we first project the three dimensional points A, B, C and D on a plane perpendicular to $Z_p$ and at unit distance from O. Let these points be A″, B″, C″ and D″ respectively. Then, $f_x$ is given by P/|A″B″|. Similarly, $f_y$ is given by P/|A″C″|. For finding $o_y$, we consider the center of the three dimensional line AB. Since we know the three dimensional coordinate of this point and $f_x$ and $f_y$, we can find the projector y-coordinate for this point assuming $o_y=0$ and subtract Q/2 from it to obtain $o_y$.

Consider the step of geometric registration. Following auto-calibration of the projectors, we use the projector and the display parameters to register the images from the multiple projectors on the display in a "wallpaper" fashion. To wallpaper the image on the display, we seek a two dimensional parameterization of the three dimensional display surface with (s, t). As per our setup, t is automatically parameterized since Y=t. Also, Z=f(X). Hence, we find a curve length based parameterization given by $s=\int_0^X \sqrt{1+f'(x)}\,dx$.

The geometric registration involves finding the function that relates the projector coordinates (x, y) to the display parameter (s, t). Assuming the image to be wall-papered to have the same parameterization of the display, we first cast a ray through the pixel (x, y) using the auto-calibrated projector coordinates and find the three dimensional coordinates of its intersection with the cylindrical surface. Then we find the corresponding (s, t) values and bilinearly interpolate the color in the image to generate the color at the projector pixel (x, y).

We have implemented the auto-calibration method on a cylindrical display using four projectors. We used Epson 1825p LCD projectors (about $600 each). Our display has a radius of about 14 feet and an angle of 90 degrees. We arranged the projectors in two different configurations: a panoramic configuration where projectors are arranged in a 1×4 array (projectors in a row) and a second one where they are arranged in a 2×2 array. Our unoptimized MATLAB implementation of the algorithm rakes about 6 minutes. The non-linear optimization for estimating the camera parameters and display geometry takes about 5 minutes. Auto-calibration takes about 10 seconds per projector. In the curve-based optimization step, we use $w_r=3$ and •$w_c=1$.

FIG. 15 provides a visualization of the estimated camera, display and projector locations and orientations in three dimensional using our algorithm for the two different setups. FIG. 16 shows the error between the reconstructed top and bottom curves of the display. They coincide demonstrating the robustness of our method. The accuracy of our method is demonstrated by a robust geometric registration. Empirically, we have seen a maximum misregistration of less than a pixel. FIGS. 17, 18 and 19 show the results on our displays. Since all prior methods can achieve geometric registration only with precise physical fiducials or complete three dimensional reconstruction, it is difficult to find a fair comparison to our method that does not use either of them. In the absence of fiducials, the best one can do is to use a homography-based registration. We compare our results with such a method where in addition to the obvious misregistrations, the shape of the display shows that wall-papering cannot be achieved on the curved surface. To reduce the higher brightness in the overlap region, we use a simple cosine blending function. Photometric seams can be further removed by using other conventional methods.

Our empirical analysis of the performance of the method shows that our recovered camera and display parameters have errors of less than 1-2%. Further, we achieve registration of subpixel accuracy. Such accurate registration and calibration for cylindrical tiled displays has never been reported in the literature prior to our work. Finally, we also show the generality of our method for handling any vertically extruded surface (not necessarily a cylinder). The accuracy of reconstructing the display curves are evaluated over extrusions or different shapes. One such example is shown in FIG. 16.

Most screens designed for commercial purposes are quick rigid infrastructure as is the screen we used for this Work. However, we studied the effect of small deviation from extruded surface on the geometric registration in simulation. For this, the deviation is simulated using the same metric as is used to measure the accuracy of estimating the curves. The results in FIG. 16 shows that the surface need not be perfectly extruded 4 to 6% deviation from thereof results in less than I to 2 pixel misregistration.

The projectors we used, even if inexpensive, were close to perfect linear devices. However, sometimes they may have small radial distortions. In such case, a pattern can be used that has more than just two lines. If m equally placed lines are used, $X_p$ will be provided by the intersection of the m planes each containing a planar curve in three dimensional corresponding to the lines in the projector. When finding each plane, the eigenvalues of the matrix used for the linear least fit provides some insights on the three dimensional curve shape. A small second eigenvalue indicates a degenerate case where the curve is close to a line and one cannot robustly fit a plane. A high third eigenvalue indicates a large fitting error, i.e. the curve does not lie on a plane due to presence of radial distortion in the projectors. Hence, when finding these lines using linear least squares intersection of the planes, the equations due to each plane can be weighted by a ratio of its second and third eigenvalues found during the prior plane fitting step. This assures that curves which indeed lie on a plane are given larger weight than either the degenerate case or when severe radial distortion is present. To avoid an infinite weight resulting from a third eigenvalue which is close to 0 (the best case of a curve robustly lying on a plane), we provide a threshold to the maximum weight. Our simulation shows acceptable registration when using this method in the presence of small radial distortions.

In summary, we have presented the first work to autocalibrate projectors on vertically extruded surfaces without using point based projector to camera correspondences. Our projector auto-calibration is achieved via a deterministic efficient algorithm that allows interactive changes in the projector position, orientation and zoom factor. Our method can have tremendous application in auto-calibration of large cylindrical displays commonly used for edutainment purposes. Further it enables having multiple overlapped projectors in CAVE™, a commonly used VR and visualization display tool. Hence, such displays can be calibrated better than they have ever been before.

However, our method is limited to extruded surfaces and cannot handle another kind of commonly used screens, the domes. Similar fundamentals of using prior knowledge of the screen to design methods to achieve geometric registration without the use of fiducials using the spirit and teachings of the invention are within the scope of the invention. Further, we include within the scope of the invention the possible variation of our method to tolerate greater deviation from extruded surfaces. Reasonable deviation from perfectly extruded surfaces will allow lower precision in the screen manufacturing making these displays more affordable.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A method of registering multiple projectors projecting onto a three dimensional surface, comprising:
    via a processing unit:
        estimating camera parameters of an uncalibrated camera based on:
            camera settings of the uncalibrated camera, and
            a known aspect ratio of the three dimensional surface, wherein the camera parameters include at least a focal length of the uncalibrated camera;
        defining a first coordinate system for an image plane of the uncalibrated camera using estimated camera parameters from the step of estimating camera parameters;
        defining a second coordinate system for the three dimensional surface;
        defining a third coordinate system for a projector image plane associated with at least two of the projectors;
        mapping coordinates in the second coordinate system to coordinates in the first coordinate system;
        mapping coordinates in the second coordinate system to coordinates in the third coordinate system;
        determining a relationship between coordinates in the third coordinate system and coordinates in the first coordinate system based on the:
            mapping of the coordinates in the second coordinate system to coordinates in the first coordinate system, and
            mapping of the coordinates in the second coordinate system to coordinates in the third coordinate system; and
        registering the projectors to the three dimensional surface based on the relationship between coordinates in the third coordinate system and coordinates in the first coordinate system.

2. The method of claim 1, includes using the known aspect ratio of the three dimensional surface in a non-linear optimization to recover the camera parameters.

3. The method of claim 1, includes ray casting through flanking top curves of the three dimensional surface to recover a top curve in three dimensions and extruding the top curve down the three dimensional surface to recover the shape of the entire three dimensional surface.

4. The method of claim 3, further comprising generating an arc length parameterization of the flanking top curves.

5. The method of claim 1 including fitting a rational Bezier to the coordinates in the second coordinate system mapped to the coordinates in the first coordinate system.

6. The method of claim 2 where the nonlinear optimization comprises performing a corner-based optimization and an curve-based optimization.

7. The method of claim 6 where the corner-based optimization and the curve-based optimization comprises a first phase of non-linear corner based optimization that minimizes the reprojection error of the four corners of the three dimensional surface, followed by the curve-based optimization that minimizes reprojection error between a captured shape of top and bottom flanking path curves of the three dimensional surface.

8. The method of claim 1 where the three dimensional surface is a smooth or piecewise planar vertically extruded surface formed by a smooth and piecewise linear path curve, where parts of an image for each projector comprises a deterministic geometric auto-calibration to find intrinsic and extrinsic parameters of each projector; and a mapping that relates projector image plane coordinates (x,y) directly to image plane coordinates of the three dimensional surface, where the intrinsic parameters comprise vertical offset and where the extrinsic parameters comprise a position and orientation of respective projectors.

9. The method of claim 8 where geometric auto-calibration is independently performed for each projector and comprises projecting a pattern from each projector which pattern includes a top and bottom curve, capturing an image of said pattern by the uncalibrated camera, and using a deterministic algorithm using said captured image, the recovered camera parameters and the shape of the three dimensional surface to estimate the intrinsic and extrinsic parameter of each projector.

10. The method of claim 9 further comprising finding a view frustum of each projector to recover intrinsic parameters of each projector.

11. The method of claim 8 where said mapping allows a registration which is correct from an arbitrary view point by rendering a virtual image of a three dimensional scene from a virtual arbitrary viewpoint in virtual image coordinates, mapping the virtual image coordinates to the three dimensional surface via a projective texture from the virtual viewpoint, and mapping coordinates of the three dimensional surface back to the projector image plane coordinates (x,y) using the recovered intrinsic and extrinsic parameters.

12. The method of claim 8 where the three dimensional surface includes vertically extruded surfaces with corners.

13. The method of claim 9 further comprising changing projector pose or orientation.

14. The method of claim 1 further comprising providing overlapping projectors on the corner of an automatic virtual environment.

15. The method of claim 1 further comprising performing each of the steps in real-time using the processing unit driving the projectors making it the registration of the projectors suitable for real-time head-tracked users in a virtual reality environment.

* * * * *